United States Patent [19]

Naramore

[11] 4,447,817

[45] May 8, 1984

[54] CONSTANT VELOCITY COPY SHEET TRANSPORT WITH INK JET PRINTING

[75] Inventor: Raymond A. Naramore, Penfield, N.Y.

[73] Assignee: Xerox Corporation, Stamford, Conn.

[21] Appl. No.: 423,874

[22] Filed: Sep. 27, 1982

[51] Int. Cl.³ .......... G01D 15/18

[52] U.S. Cl. .......... 346/75; 271/4

[58] Field of Search .......... 271/4; 346/134, 136, 346/76 L, 76 PH, 78, 141, 75; 355/73, 76

[56] References Cited

U.S. PATENT DOCUMENTS 3,874,621 4/1975 Blair et al. .......... 346/136

4,080,053 3/1978 Friday .......... 355/73

4,237,466 12/1980 Scranton .......... 271/4

4,307,958 12/1981 McIrvine .......... 355/23

*Primary Examiner*—E. A. Goldberg

*Assistant Examiner*—G. Preston

*Attorney, Agent, or Firm*—Bernard A. Chiama

[57] ABSTRACT

A constant velocity transport (CVT) is disclosed for use with a marking apparatus such as an ink jet printing system. The transport utilizes vacuum hold-down plenums to convey sheets to and away from the printing zone of the marking apparatus and a sheet-attracting vacuum arrangement, between the two plenums for drawing the sheet to a guide surface as the sheet moves through the printing zone. The sheet-attracting action is effective just at the point marking is effective upon the sheet thereby insuring the precise location of the sheet for printing.

7 Claims, 4 Drawing Figures

CONSTANT VELOCITY COPY SHEET TRANSPORT WITH INK JET PRINTING

This invention relates to sheet transport mechanisms, especially for such mechanisms which may be utilized with ink jet printing.

In ink jet printing, to produce quality results, each copy sheet passing an ink jet print head having a string of ink jets, must do so as close as possible to the bar in order to maximize resolution of the resultant imaging. Variations in copy sheet thicknesses, or unevenness or wandering of mechanical devices or transports bringing copy sheets to and through the printing zone of the ink jets will result in corresponding excursions of a copy sheet away from the ink jet print head thereby seriously degrading the resolution of imaging. In addition, to insure high image resolution, it is necessary to provide movement of the copy sheet through the printing zone at a constant velocity. Incidental to these requirements, but as equally important is the need to provide an arrangement wherein there is no contamination caused by ink in the event that misfeed of copy sheets is experienced. Throughout movement of copy sheets transversely across the string of ink jets during a printing mode, the above-referred to requirements may be enhanced by maintaining close and positive control on each copy sheet during transporting through the printing zone of the ink jets. In U.S. Pat. No. 4,307,958, a sheet transport is disclosed for an ink jet printer and is devised to provide constant linear velocity. However, there is no arrangement for insuring that the printing surface of a sheet will always be at a fixed distance relative to the ink jets.

Therefore, it is the principle object of the invention to insure constant velocity transporting of copy sheets during ink jet printing thereby enhancing the quality of the printing in this technology.

Still another object of the present invention is to maximize image resolution in the art of ink jet printing by maintaining close and unwavering application of receiving copy material adjacent the discharge nozzles of printing ink jets.

The present invention utilizes a copy sheet transport of the belt type having a vacuum assist in order to maintain positive control of a copy sheet thereon. Copy sheets are directed upon the input end of a specially constructed belt transport by a pair of guide plates to insure accurate and positive placement of sheets on the transport. The transport includes a perforated belt and comprises two principle sections spaced apart in the direction of movement of the belt to form an elongated narrow space between the sections transversely of the transport. A vacuum guide plate operative in conjunction with an ink jet print head is positioned parallel to and slightly spaced from the narrow space thereby defining a printing zone. The vacuum guide plate extends transversely of the paper path and the full width of the transport. This plate is formed on its underside surface with many narrow grooves and holes extending through the plate and in communication with each of the grooves. As the sheet is placed upon the belt of the transport in a flowing manner, a vacuum hold-down chamber positioned within the transport accurately holds the sheet to the belt as the same is conveyed along the transport. A full-width, vacuum chamber having a very narrow air intake slot is positioned above the vacuum guide plate with the slot in communication with the holes formed in the vacuum guide plate. As a copy sheet is moved by the transport belt into the printing zone, this vacuum chamber attracts the sheet vertically upwardly and positively holds the sheet against the underside surface of the vacuum guide plate and in a precise plane as the sheet continues its movement past the ink jet print head thereby insuring accurate placement of the sheet relative to the output ends of the ink jets.

Further objects and advantages will be apparent after studying the following description taken in conjunction with the accompanying drawings wherein.

Figure 1:
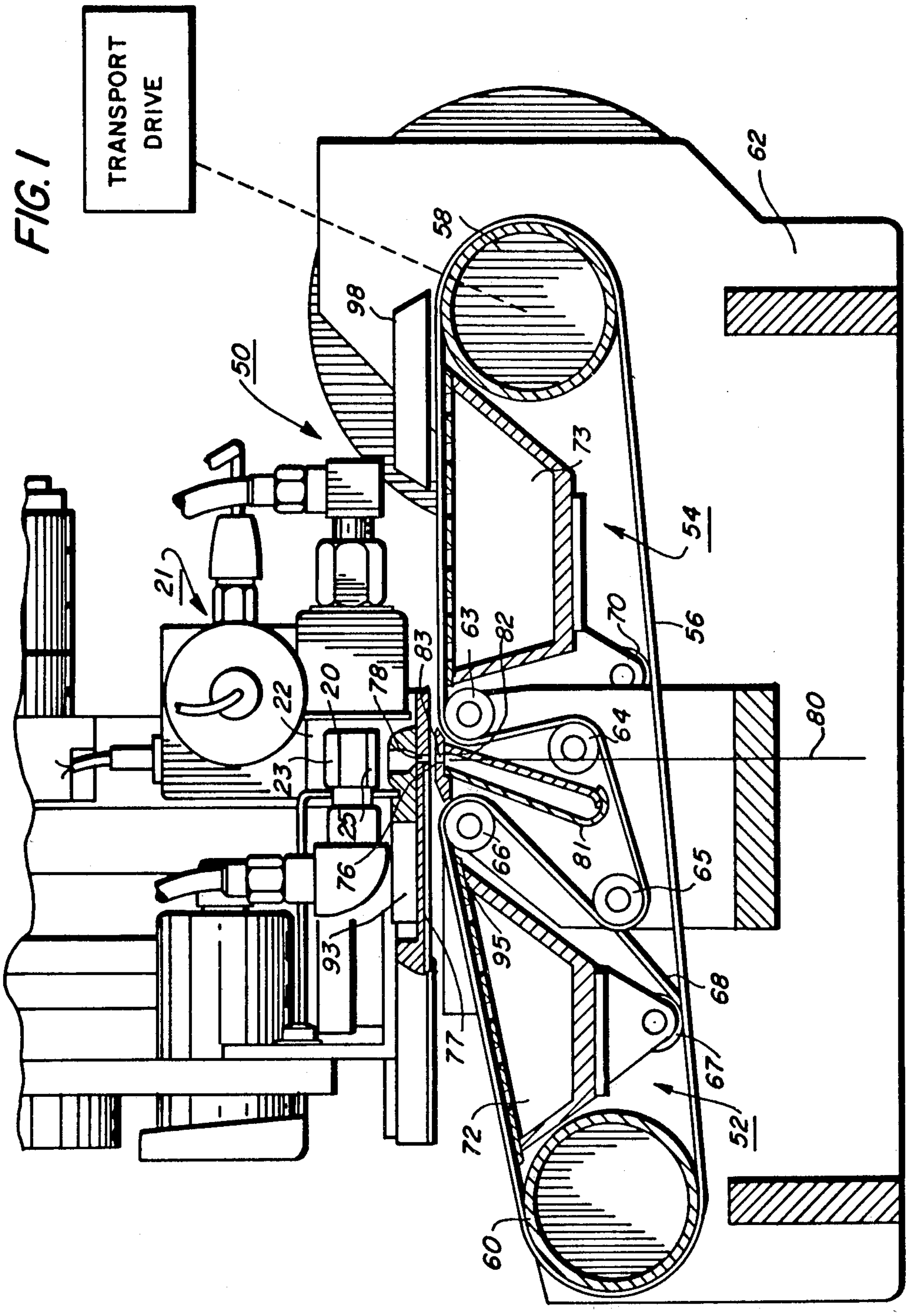
FIG. 1 is a cross section view of a belt transport in accordance with the present invention for guiding copy sheets through the printing zone for the ink jets in the machine.

Referring to the arrangement illustrated in FIG. 1, there is shown an ink jet printing head 20 of an ink jet printing apparatus generally indicated by the reference numeral 21. The ink jet print head 20 may be of any suitable type comprising one or more full-width strings of jets for printing representations of a document sheet being scanned. In ink jet printing, there are two general types of operative arrangements affecting the print heads, respectively. In one, an on-demand printing type, an ink droplet is released in response to a signal, in the other, the continuous-flow type, droplets are continuously flowing and are directed in precise printing sequences utilizing various electrostatic controls. In the latter type, an ink gutter is arranged adjacent the discharge ends of the jet nozzles to collect ink droplets not intended for printing while receiving material, such as paper is within the printing zone of the print head.

In FIG. 1, ink from a source cavity 22 is placed under pressure by a suitable piezoelectric device 23 and ejects as droplets from a relatively large number of orifices 24 (see FIG. 3) formed in a nozzle plate 25 positioned in one or more closely spaced, parallel lines of ink jets. The flow of the droplets may be under control by electrostatic charging electrodes (not shown) which, in response to electrical signals from a circuit, not shown, deposit drops of ink accordingly on receiving material such as a sheet of paper. The present invention does not contemplate any specific type of ink jet print head and therefore further details of any particular type is not necessary. Any type of print head, such as that disclosed in U.S. patent application Ser. Nos. 296,922, filed Aug. 27, 1981, and 326,721, filed Dec. 2, 1981, assigned to the same assignee as the present application may be utilized.

The head 20 is mounted in a fixed position relative to a copy sheet transport system generally indicated by the reference numeral 50. The transport system is arranged to transport each copy sheet seriatim below the ink jets of the head 20 to have ink droplets applied thereto in accordance with or representative of the informational areas on the document sheet being scanned. As will be described hereinafter, the transport 50 is adapted to bring each sheet into the printing zone of the ink jet head at constant velocity and in accurately spaced relationship relative to the discharge ends of the ink jets to maintain depth of focus for the ink jets regardless of the variations of copy sheet thickness, misalignment, the exceeding of structural tolerances, or dimensional changes which may be induced into the transporting of copy sheets by the structural elements of the transport 50.

The copy sheet transport 50 devised in accordance with the present invention comprises two sections: pre-print section 52 and post-print section 54 and includes a belt conveyor having a single belt 56 entrained around a drive roller 58 and an idler roller 60. The sections 52 and 54 are suitably mounted upon a machine frame 62 which also rotatably supports the drive roller 58 and the idler roller 60. The belt 56 is also entrained around a pair of idler rollers 63, 64 mounted in the post-print section 54 and a pair of idler rollers 65, 66 mounted in the pre-print section 52. As shown in FIG. 1, the path of the belt 56 extends from the idler roll 60 around and above the roller 66, to and below the idler roller 65, and then to the idler rollers 64 and 63, around the drive roller 58 and back to the idler roller 60.

Figure 2:
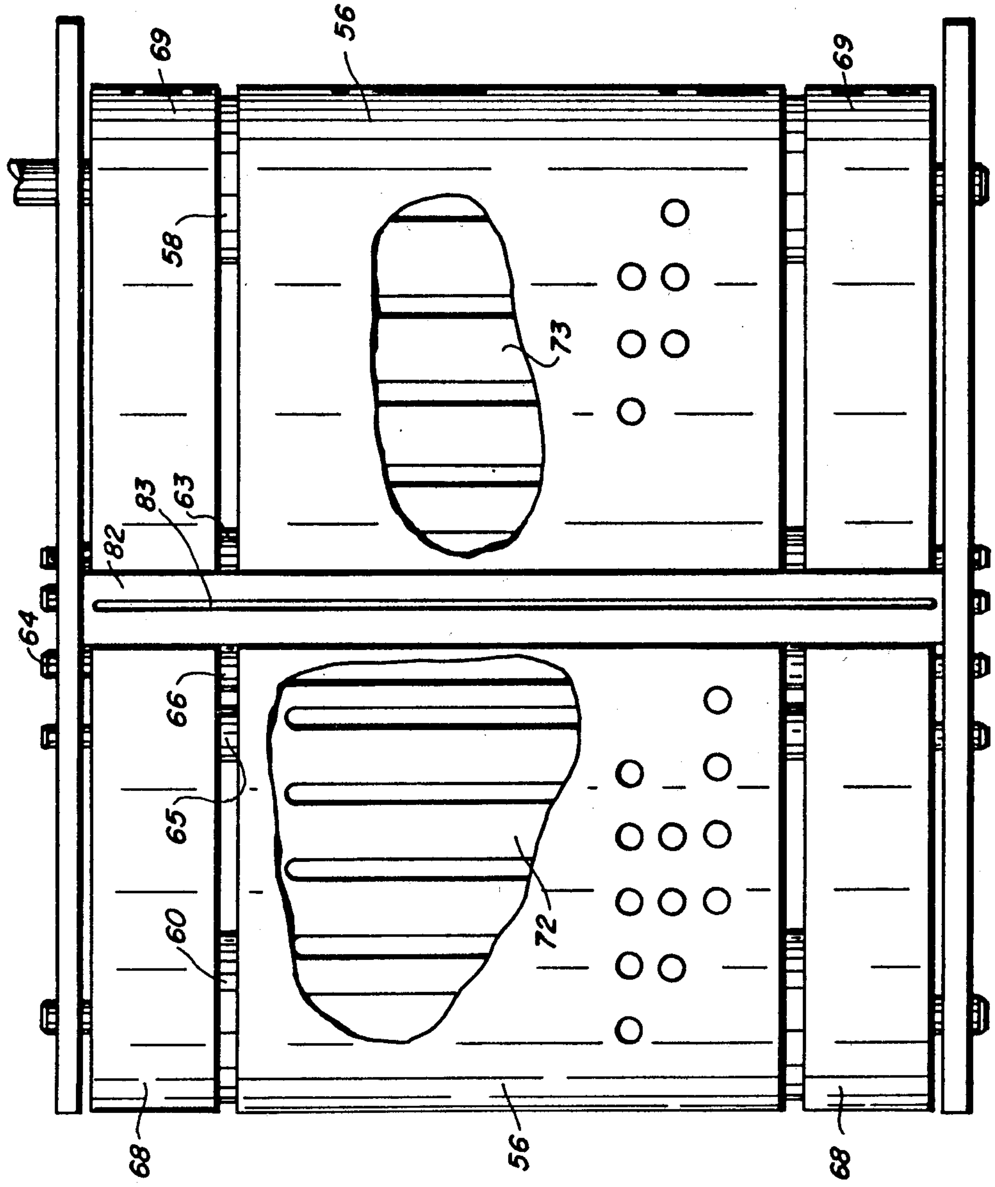
FIG. 2 is a plan view of the belt transport.

As shown in FIG. 2, the belt 56 occupies the center section of the transport 50 preferably having a width somewhat less in dimension than a copy sheet applied thereto. Entrained around the rollers 60, 66 and an idler roller 67 in the pre-print section 52, is a helper belt 68, one being applied to each end of the combination of the rollers 60, 66, 67. Similarly, a helper belt 69 is entrained around the rollers 58, 63 and 70 in the post-print section 54. As shown in FIG. 1, the belt 56 is perforated, the perforations cooperating with slots formed in a vacuum hold-down chamber 72 mounted between the belt runs in the section 52 and slots formed in a vacuum hold-down chamber 73 mounted between the belt runs in the section 54. The vacuum chambers 72, 73 are suitably connected to a vacuum source (not shown).

A pair of pinch rollers 74 is positioned upstream of the pre-print section 52 and is arranged to pick up copy sheets from a paper supply source and direct the same onto the belt 56. Upper and lower guide plates 75 precede the pinch rollers 74 for guiding sheets into the pinch rollers whereat each copy sheet is registered prior to operative engagement with the ink jet head 20. The space between the idler rollers 63 and 66 and generally above the plane of the upper surfaces of the belt runs of belt 56 defines a printing zone 76.

Spanning this printing zone a generally horizontal, vacuum guide plate 77 is mounted to extend the full width of the transport 50 which is somewhat wider than the largest copy sheet to be printed. The forward edge of this plate projects over the roller 66 toward the roller 60 to define a tapering throat with the upper run of the belt 56 while the same moves on the pre-print section 52. As shown in FIG. 1, the belt run on the section 52 is slightly inclined to the horizontal plane thus forming the throat for the movement of copy sheets to the printing zone 76. The rear edge of the plate 77 projects over the roller 63 toward the drive roller 58.

Figure 3:
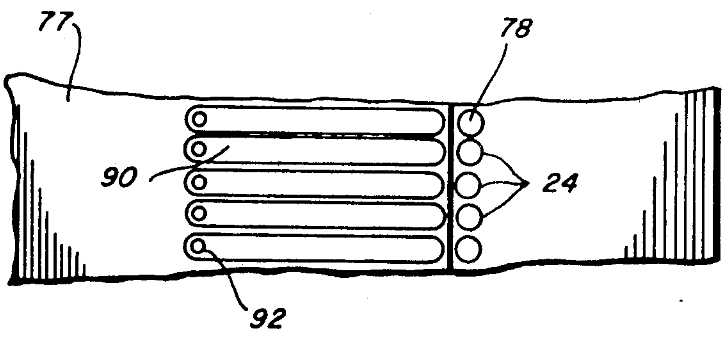
FIG. 3 is a fragmentary view of the vacuum guide plate taken from below.
Figure 4:
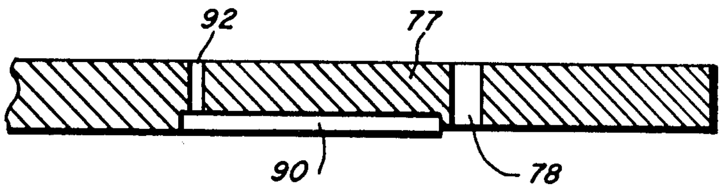
FIG. 4 is a cross-section view of the vacuum plate taken along the longitudinal axis of vacuum grooves.

As shown in FIGS. 3 and 4, the under surface of the plate 77 is formed with a full-length, narrow slot 78 in alignment with the string of orifices 24 formed in the nozzle plate 25, each corresponding with a jet of the ink jet head 20. As ink ejects from the ink jets through a corresponding orifice 24, it is directed through the slot 78 during a printing operation. As shown in FIG. 3, the ink jets are arranged in a line coincident with a vertical plane illustrated by the numeral 80 which extends between the rollers 63, 66, but being somewhat closer to the roller 63. An ink gutter 81, which may be utilized for calibrating the individual ink jets is mounted between the sections 52, 54 within the space outlined by the rollers 63, 64, 65, 66. The gutter includes a generally horizontal plate 82 at its upper end having its top surface in the print zone 76 and closely spaced relative to the under surface of the vacuum plate 77.

The top surface of the plate 82 serves to prevent the leading edge of copy sheets from dropping down into the gutter space between the rollers 63, 66. The plate 82 is formed with a long, narrow slot 83 running the full length of the plate and gutter 81, which is utilized for receiving ink droplets when paper is not present in the printing zone as during a calibration sequence or for any other reason that ink is caused to flow without having a copy sheet present to receive the same. The lower surface of the vacuum printing plate 77 is parallel to and very accurately spaced from the upper plane of the plate 82, the space being somewhat greater than the thickness of a copy sheet.

The underside of the vacuum guide plate 77 is formed with a hole/groove pattern comprising a plurality of parallel arranged grooves 90 having their axes extending transversely of the plate 77 and formed on the entire length thereof. Each of the grooves in the pattern are associated with an opening 92, one at each end of the bottom of a groove. The openings 92 are in communication with a vacuum chamber 93 located above and on the plate 77, the vacuum chamber being connected to a source of vacuum not shown.

When vacuum is applied to the grooves 90 by way of the openings 92, a copy sheet being transported by means of the conveyor belt 56 is drawn upwardly as viewed in FIG. 3 and into engagement with the lower surface of the plate 77. The relative vacuum pressures between the vacuum chamber 93 associated with the plate 77 and the vacuum chamber 72 is such that the paper in leaving the end edge 95 of the chamber 72 is immediately pulled away from the belt 56 and drawn against the lower surface of the plate 77. It is to be noted that the printing slot 78 and, therefore, the ink jet line of orifices 24 formed in the plate 25 is very close to the adjacent ends of the grooves 90 in order to insure that a copy sheet will at all times during its passage through the printing zone remain against the under surface of the plate 77. In this manner, the sheet will always be driven through the printing zone and in printing engagement with the ink jet printing head in a precise and unwavering attitude.

As the sheet is conveyed through the printing zone 76 and out of the influence of the vacuum associated with the grooves 90, the sheet is drawn back onto the belt 56 at the post-print section 54 by means of the influence it will receive from the vacuum chamber 73. These movements of a sheet from the surface of the belt 56 at the pre-print section 52 to the lower surface of the printing plate 77 and then back to the belt 56 in the post-print section 54 is relatively small, the maximum spacing between the sheet engaging lower surface of the plate 77 and the upper surface of the belt runs of the belt 56 being made slightly greater than the maximum variations in the thickness of copy sheets along with variations and thicknesses of the belt 56 and the tolerances for which the structure elements of the belt transport are subjected.

By virtue of the above described structure, it will be appreciated that during passage of a copy sheet through a printing zone whereat ink jets may be applied thereto, the copy sheet is positioned accurately at all times regardless of the variations in the thicknesses of the copy sheet or transporting belts and the structural elements of the transport system. Continued movement of a sheet by the combined action of the transport vacuum chamber 73 and the belt 56 on the post-printing section 54 carries the sheet under a heater device 98 whereat the ink placed on the sheet may be fixed under heat conditions. While the transport 50 has been illustrated and described with respect to the same being in a generally horizontal configuration, it is to be understood that the transport may also be arranged in a vertical plane. In this configuration, the ink jet printing apparatus 21 would also be turned 90° and the copy sheet paper paths devised in accordance therewith.

While the invention has been described with reference to the structure disclosed, it is not confined to the details set forth but is intended to cover such modifications or changes as may come within the scope of the following claims.

I claim:

1. A transport apparatus for conveying sheet material to a printing zone whereat a full width, marking device is positioned to permit marking of the material comprising:

a transport belt movable in a path, a plane of which is contiguous with the printing zone and arranged to convey sheet material into marking engagement with the marking device, a vacuum plate having a surface generally parallel to said plane between which sheet material is conveyed, said plate being provided with at least one air intake vacuum opening positioned closely adjacent and along the marking device, said plate being operatively associated with a vacuum source and arranged to draw sheet material against said surface and the marking device, and means for driving said transport belt in said path with sheet material thereon whereby the sheet will be driven through the printing zone and past the marking device as the sheet material is moved along said vacuum plate surface.

2. A transport apparatus for conveying sheet material to a printing zone whereat a full width, ink marking device is positioned to permit the transfer of ink to marking the material comprising:

a transport belt movable in a path, a plane of which is contiguous with the printing zone and arranged to convey sheet material into marking engagement with the marking device, a vacuum device having a surface operatively associated with a vacuum source and arranged to draw sheet material against said surface and the marking device, said surface and the marking device being spaced and opposite said belt, and means for driving said transport belt in said path with sheet material thereon whereby the sheet will be driven through the printing zone and past the marking device as the sheet material is moved along said vacuum plate surface.

3. A transport apparatus for conveying sheet material to a printing zone whereat a full width, marking device is positioned to permit marking of the material comprising:

a transport mechanism having a belt movable in a path, a plane of which is contiguous with the printing zone and arranged to convey sheet material into marking engagement with the marking device, a vacuum device having a surface operatively associated with a vacuum source and arranged to draw sheet material against said surface and the marking device, said surface and the marking device being spaced and opposite said mechanism, said transport mechanism including two transporting sections, one being positioned to direct sheet material to the printing zone and the other being positioned to direct sheet material away from the printing zone, and means for driving said transport belt in said path with sheet material thereon whereby the sheet material will be driven through the printing zone and past the marking device as the sheet material is moved along said vacuum plate surface.

4. The apparatus of claim 3 wherein said transporting section which is positioned to direct sheet material to the printing zone includes a vacuum plenum arranged to hold the material onto said belt.

5. A transport apparatus for conveying sheet material to a printing zone whereat a full width, ink jet printing apparatus having a row of ink jets is positioned to permit marking of the material moving thereagainst comprising:

a transport belt movable in a path, a plane of which is contiguous with the printing zone and arranged to convey sheet material into marking engagement with the ink jets of the printing apparatus, a vacuum device having a surface operatively associated with a vacuum source and arranged to draw sheet material against said surface and the ink jets, said surface and the ink jets being positioned on the same side of the sheet material conveyed by said belt, said surface being provided with a vacuum connection to said source in side by side relationship to the row of ink jets, and means for driving said transport belt in said path with sheet material thereon whereby the sheet will be driven through the printing zone and past the marking device as the sheet material is moved along said vacuum plate surface.

6. A transport apparatus for conveying sheet material to a printing zone whereat a full width, marking device is positioned to permit marking of the material comprising:

a transport belt movable in a path, a plane of which is contiguous with the printing zone and arranged to convey sheet material into marking engagement with the marking device, a member having a surface adjacent said path along which sheet material is conveyed, air moving means effective along a line closely adjacent and along the marking device and being arranged to draw sheet material against said surface and the marking device, and means for driving said transport belt in said path with sheet material thereon whereby the sheet will be driven through the printing zone and past the marking device as the sheet material is moved along said surface.

7. A transport apparatus for conveying sheet material to a printing zone whereat a full width, ink jet printing apparatus having a row of ink jets is positioned to permit marking of the material moving thereagainst comprising:

a transport belt movable in a path, a plane of which is contiguous with the printing zone and arranged to convey sheet material into marking engagement with the ink jets of the printing apparatus, a member having a surface adjacent said path, said surface and ink jets being spaced and opposite said belt, air moving means effective along a line closely adjacent and along the row of ink jets and being arranged to provide pressure upon sheet material against said surface and the ink jets, and means for driving said transport belt in said path with sheet material thereon whereby the sheet will be driven through the printing zone and past the marking device as the sheet material is moved along said surface.

* * * * *